US006449642B2

(12) United States Patent
Bourke-Dunphy et al.

(10) Patent No.: US 6,449,642 B2
(45) Date of Patent: Sep. 10, 2002

(54) METHOD AND SYSTEM FOR INTEGRATING A CLIENT COMPUTER INTO A COMPUTER NETWORK

(75) Inventors: Erin Marie Bourke-Dunphy; Kartik Nadipuram Raghavan, both of Seattle; George Jenkins, Redmond; Bill Ingle, Redmond; Keith Logan, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/153,399

(22) Filed: Sep. 15, 1998

(51) Int. Cl.[7] .................. G06F 15/16; G06F 15/177
(52) U.S. Cl. ............................... 709/222; 709/223
(58) Field of Search .................. 709/222, 223, 709/221, 220, 228, 230, 237; 713/1, 2, 100; 717/11

(56) References Cited

U.S. PATENT DOCUMENTS

| | | | | |
|---|---|---|---|---|
| 5,142,680 A | * | 8/1992 | Ottman et al. ................. 717/11 |
| 5,247,683 A | * | 9/1993 | Holmes et al. ............. 709/221 |
| 5,263,164 A | * | 11/1993 | Kannady et al. ................ 713/1 |
| 5,394,522 A | * | 2/1995 | Sanchez-Frank et al. ... 345/349 |
| 5,555,416 A | * | 9/1996 | Owens et al. .................. 717/11 |
| 5,586,304 A | * | 12/1996 | Stupek, Jr. et al. ........... 717/11 |
| 5,717,930 A | * | 2/1998 | Imai et al. ..................... 717/11 |
| 5,805,897 A | * | 9/1998 | Glowny ....................... 717/11 |
| 5,809,145 A | * | 9/1998 | Slik et al. ..................... 705/52 |
| 5,838,907 A | * | 11/1998 | Hansen ....................... 709/220 |
| 5,845,077 A | * | 12/1998 | Fawcett ....................... 709/221 |
| 5,845,090 A | * | 12/1998 | Collins, II et al. .......... 709/221 |
| 5,875,327 A | * | 2/1999 | Brandt et al. .................. 713/1 |
| 5,931,909 A | * | 8/1999 | Taylor ........................ 709/221 |
| 5,941,954 A | * | 8/1999 | Kalajan ...................... 709/239 |
| 6,006,035 A | * | 12/1999 | Nabahi ........................ 717/11 |
| 6,012,088 A | * | 1/2000 | Li et al. ...................... 709/219 |
| 6,029,196 A | * | 2/2000 | Lenz .......................... 709/221 |
| 6,047,129 A | * | 4/2000 | Frye ............................ 717/11 |
| 6,066,182 A | * | 5/2000 | Wilde et al. .................... 717/11 |
| 6,073,172 A | * | 6/2000 | Frailong et al. ............ 709/222 |
| 6,094,679 A | * | 7/2000 | Teng et al. .................. 790/220 |
| 6,098,097 A | * | 8/2000 | Dean et al. ................. 709/220 |
| 6,105,066 A | * | 8/2000 | Hayes ........................ 709/226 |
| 6,125,389 A | * | 9/2000 | Hjalmtysson ............... 709/221 |
| 6,151,643 A | * | 11/2000 | Cheng et al. ................. 710/36 |
| 6,202,206 B1 | * | 3/2001 | Dean et al. .................... 717/11 |
| 6,256,635 B1 | * | 7/2001 | Arrouye et al. ............. 707/102 |

(List continued on next page.)

OTHER PUBLICATIONS

VanStean, Jutta "Installing NetWare for Small Business 4.2", www.elementkjournals.com/inw, pp. 1–7, Jun. 1999.*

Stevenson, Rich "Deploying Apache Web server for Netware", www.elementkjournals.com/inw, pp. 1–20, Dec. 2001.*

(List continued on next page.)

Primary Examiner—Zarni Maung
Assistant Examiner—Jason D. Cardone
(74) Attorney, Agent, or Firm—Leydig, Voit & Mayer, Ltd.

(57) ABSTRACT

An improved method and system for integrating a client computer into a computer network is described. At the server, information is taken from a user's account, user input, and the server registry and a series of application configuration files is generated for use by an installation program. A client set-up program automatically configures the client computer for communication with the server. An installation manager installs application programs from the server to the client computer, configuring them according to the application configuration files.

21 Claims, 21 Drawing Sheets

U.S. PATENT DOCUMENTS

| | | | | |
|---|---|---|---|---|
| 6,266,811 | B1 | * | 7/2001 | Nabahi .......................... 717/11 |
| 6,286,038 | B1 | * | 9/2001 | Reichmeyer et al. ........ 709/220 |
| 6,292,889 | B1 | * | 9/2001 | Fitzgerald et al. .............. 713/1 |
| 6,292,941 | B1 | * | 9/2001 | Jollands ........................ 717/11 |
| 6,295,556 | B1 | * | 9/2001 | Falcon et al. ................ 790/220 |
| 6,301,707 | B1 | * | 10/2001 | Carroll et al. ................. 717/11 |
| 6,324,578 | B1 | * | 11/2001 | Cox et al. .................... 709/223 |

OTHER PUBLICATIONS

CNET News, "Microsoft Profits from License Changes", news.cnet.com/news/, pp. 1–3, Sep. 1998.*

Kadnier, Griffith. *The Complete Reference—Windows® NT 4,* pp. 471–502, Berkeley, California: Osborne McGraw Hill, 1997.

Microsoft Press. *Microsoft Windows® 95 Resource Kit,* pp. 180–181, 249–262, 592–593, 967, and 971–973. Redmond, Washington: 1995.

Norton, P. and Mueller, J.P. *Peter Norton's Complete Guide to Windows® 95,* pp. 241–247. Indianapolis, Indiana: SAMS Publishing, 1998.

* cited by examiner

FIG. 11

```
[SCW_SupportedNICs]
SCW_NICListIniFileName=net.ini
SCW_NICListIniFileFileListSectionName=SCWFloppyFileListForNewComputer
SCW_NICListIniFileSectionName=NETMENU
SCW_NICListKeyTemplate=ITEM%d
SCW_NICListFile=\floppy\net.ini
[SCW_OptionalApplications]
;
SCW_NumberOfApps=7
SCW_AppName0=MS_FAX
SCW_AppDisplayString0=Microsoft Fax client
SCW_AppSelectedByDefault0=YES
SCW_AppRequiresUnattendedTextFile0=YES
SCW_AppTemplatePath0=Template
SCW_AppTemplateSourceName0=setup.iss
SCW_AppTemplateDestName0=setup.iss
SCW_AppSetupInfPath0=Template
SCW_AppSetupInfSourceName0=clifax.inf
SCW_AppSetupInfDestName0=clifax.inf
SCW_AppArchitectureList0=win95
```

Details shown in FIG. 12

```
SCW_AppName1=MS_IEXPLORE
SCW_AppDisplayString1=Microsoft Internet Explorer
SCW_AppSelectedByDefault1=YES
SCW_AppRequiresUnattendedTextFile1=YES
SCW_AppTemplatePath1=
SCW_AppTemplateSourceName1=
SCW_AppTemplateDestName1=
SCW_AppSetupInfPath1=Template
SCW_AppSetupInfSourceName1=cliie.inf
SCW_AppSetupInfDestName1=cliie.inf
SCW_AppArchitectureList1=win95,i386

SCW_AppName2=MS_MSHARE
SCW_AppDisplayString2=Microsoft Modem Sharing client
SCW_AppSelectedByDefault2=YES
SCW_AppRequiresUnattendedTextFile2=YES
SCW_AppTemplatePath2=
SCW_AppTemplateSourceName2=
SCW_AppTemplateDestName2=
SCW_AppSetupInfPath2=Template
SCW_AppSetupInfSourceName2=clmshr.inf
SCW_AppSetupInfDestName2=clmshr.inf
SCW_AppArchitectureList2=win95

SCW_AppName3=MS_OUTLOOK
SCW_AppDisplayString3=Microsoft Outlook Email client
SCW_AppSelectedByDefault3=YES
SCW_AppRequiresUnattendedTextFile3=YES
SCW_AppTemplatePath3=Template
SCW_AppTemplateSourceName3=sbs.prf
SCW_AppTemplateDestName3=sbs.prf
SCW_AppSetupInfPath3=Template
SCW_AppSetupInfSourceName3=clioutl.inf
SCW_AppSetupInfDestName3=clioutl.inf
SCW_AppArchitectureList3=win95,i386
```

FIG. 12

```
SCW_NICListIniFileName=net.ini                           →  These three entries contain information
                                                            about supported NICs
SCW_NICListIniFileFileListSectionName=
SCWFloppyFileListForNewComputer SCW_NICListIniFileSectionName=NETMENU SCW_NICListKeyTemplate=ITEM%d                            →  Information on how to retrieve data from NIC
                                                            support file
SCW_NICListFile=.\floppy\net.ini                         →  Location of authoritative list of NICs

[SCW_OptionalApplications]
;
SCW_NumberOfApps=7                                       →  Number of applications currently supported SCW_AppName0=MS_FAX                                      →  Name of application SCW_AppDisplayString0=Microsoft Fax client               →  String to be displayed
                                                            on selection list GUI
SCW_AppSelectedByDefault0=YES                            →  Is this application to be
                                                            selected by default?
SCW_AppRequiresUnattendedTextFile0=YES                   →  Does this application require
                                                            an unattended text file for setup?
SCW_AppTemplatePath0=Template                            →  What is the path for this
                                                            application's template file?
SCW_AppTemplateSourceName0=setup.iss                     →  What is the name of this application's
                                                            template file?
SCW_AppTemplateDestName0=setup.iss                       →  What is the name of the application
                                                            configuration file to be created?
SCW_AppSetupInfPath0=Template                            →  Where is the setup information
                                                            file located?
SCW_AppSetupInfSourceName0=clifax.inf                    →  What is the source name of
                                                            the setup information file?
SCW_AppSetupInfDestName0=clifax.inf                      →  What is the destination name
                                                            of the setup information file?
SCW_AppArchitectureList0=win95                           →  For which operating system
                                                            is this application to be set up?
```

FIG. 13A

```
netparam.ini before editing
[NetParams]
FloppyDate=

UserFullName=

NetCard=

Protocol=TCPIP

Redir=BASIC

Domain=

ComputerName=

User=

Password=

Server=

Share=

FormatDisk=

OSName=

SetupCmd=

RespFile=
```

→

```
netparam.ini after editing
[NetParams]
FloppyDate=Thursday, August 20, 1998  16:13:26

UserFullName=John Smith

NetCard=

Protocol=TCPIP

Redir=BASIC

Domain=LVM

ComputerName=JOHNSMITHACC_01

User=JohnSmithAccount

Password=

Server=LVM01

Share=Clients

FormatDisk=0

OSName=Microsoft Windows 95

SetupCmd=\Setup\Win95\startcli.exe

RespFile=Response\JOHNSM~1\JOHNSM~1.TXT
```

METHOD AND SYSTEM FOR INTEGRATING A CLIENT COMPUTER INTO A COMPUTER NETWORK

FIELD OF THE INVENTION

This invention relates to a method and system for integrating a client computer into a computer network, and more particularly, to a method and system for integrating a client computer into a personal computer network having a server.

BACKGROUND OF THE INVENTION

Configuring a client computer for integration into a computer network has always required a complex series of tasks. First, a client computer had be associated with the accounts of all potential users. If newly added to the network, it had to be given a name and configured to communicate with the server computer. Configuring a client computer for communication required someone with advanced computing and networking skills, since it involved installing a network interface card (NIC) with the proper drivers, installing the correct communication protocols (for example, TCP/IP), binding the protocols to the NIC, changing the name, workgroup, and domain of the computer, as well as several other steps. Finally, application programs had to be installed on the client computer, requiring further configuration.

While Information Technology (IT) professionals have become quite adept at this process, small businesses generally can not afford to have a full-time systems administrator on staff. Thus, these businesses are often forced to rely on outside expertise, increasing the cost of their systems and putting them at the mercy of consultants' schedules. Alternatively, many businesses have avoided incorporating computer networks.

SUMMARY OF THE INVENTION

The present invention provides a method and system for integrating a client computer into a computer network that is essentially self-running, thereby eliminating the need for specialized networking personnel. Specifically, the invention assigns networking parameters and creates application configuration files on a server for controlling the installation of applications to a client computer. It also configures a client computer for communication with the server with little human intervention.

Three major components comprise the invention: the Set-Up Computer Wizard (SCW), the client set-up program, and the installation manager. A preferred embodiment of the invention is packaged as part of the "BackOffice® Small Business Server" by Microsoft® Corporation of Redmond Wash.

SCW runs on the network server, collecting information such as user data, networking parameters, and a list of application programs to be installed on the client computer. It extracts information the user's account (established prior to integrating the client computer), derives the network parameters from the server configuration settings (managed by the server's operating system), and prompts the user to select the application programs to be installed on the client computer. Using the collected information, the SCW generates a set of application configuration files which the installation manager later uses to install applications onto the client computer. If the client computer is new to the network, SCW creates a set-up diskette that the user takes back to the client computer.

To configure a newly added client computer for communication, the user launches the client set-up program from the floppy diskette. The set-up program, running on the client computer, changes the client network settings, and installs the networking protocols, without requiring any additional input from the user. It then reboots the client computer, prompting the user to logon to the server.

When the user logs on from the client computer, the installation manager, running on the server, installs the applications to the client computer from the server using the application configuration files created by the SCW. Independent Software Vendors can easily make their application programs compatible with the installation manager, allowing the user to integrate numerous applications with the "BackOffice® Small Business Server."

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention may be best understood from the following detailed description taken in conjunction with the accompanying drawings of which:

FIG. 11 is a partial listing of the Scw.ini file used in a preferred embodiment of the invention;

FIG. 12 describes the purpose of the data fields used in Scw.ini;

FIG. 13a shows an exemplary template file and the resulting network parameter file created after SCW edits the template file;

DESCRIPTION OF THE INVENTION

Figure 1:
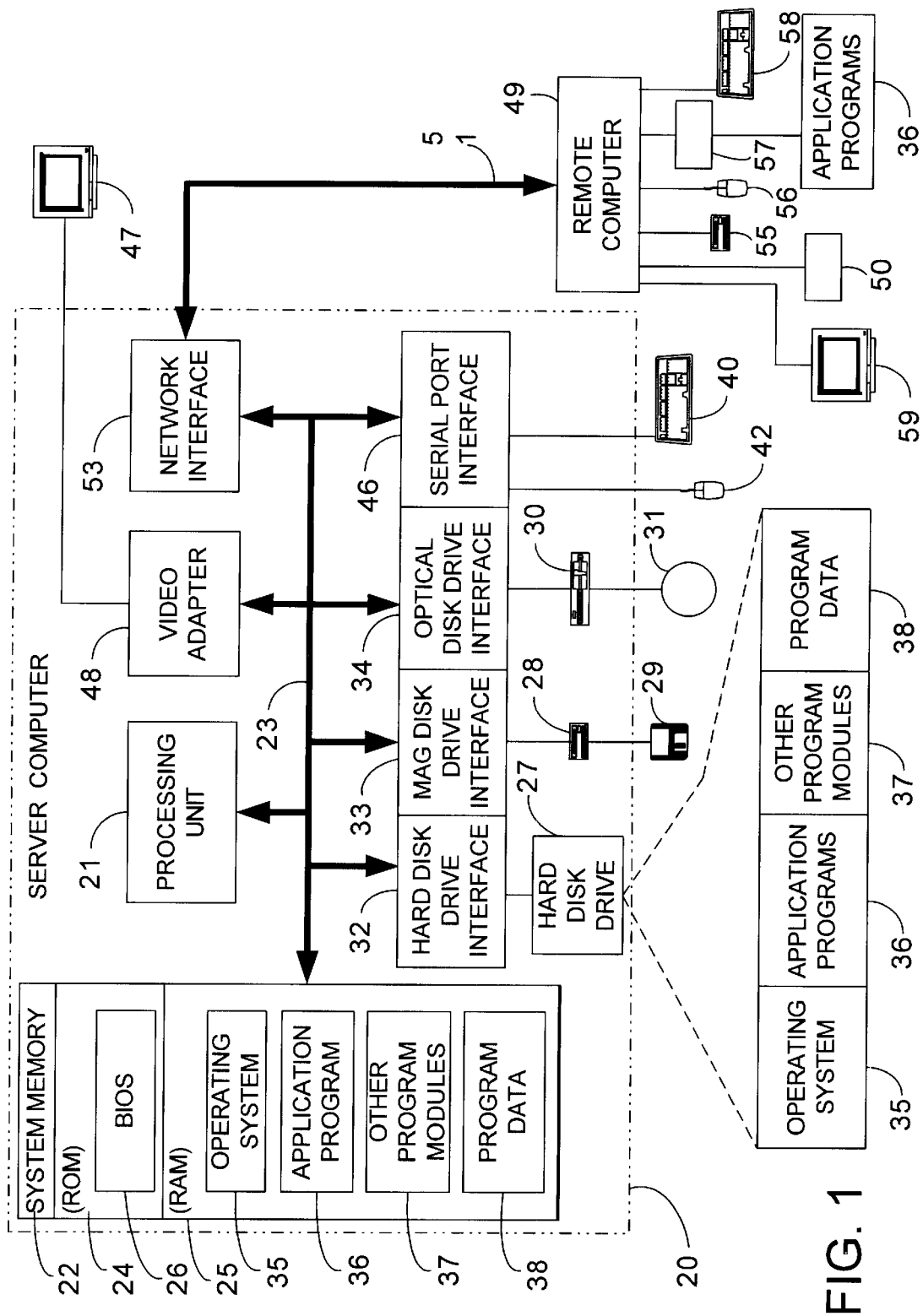
FIG. 1 is a block diagram illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types.

With respect to the client computer operating system, the Microsoft® Windows® 95 and Windows® 98 operating systems are collectively referred to as "Windows® 95/98," and those skilled in the art will recognize that the two operating systems interact with the invention in an identical manner.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

In keeping with the invention, the personal computer 20 is a server operating in a networked environment using logical connections to one or more remote computers, such as a remote computer 49. The remote computer 49 may be another personal computer, a server, a router, a network PC, a peer device or other common network node. For purposes of illustrating the invention, however, the remote computer 49 is a client computer. Remote computer 49 typically includes many or all of the elements described above relative to the personal computer 20, although only a memory storage device 50, a monitor 59, a magnetic disk drive 55, a mouse 56, a hard disk drive 57 and a keyboard 58 have been illustrated in FIG. 1. The logical connections depicted in FIG. 1 include a local area network (LAN) 51, which is commonplace in offices, enterprise-wide computer networks, and intranets.

The personal computer 20 is connected to the local network 51 through a network interface or adapter 53. Program modules depicted relative to the personal computer 20, or portions thereof, may be stored in the remote memory storage device. It will be appreciated that the network connections shown are exemplary and other means of establishing a communications link between the computers may be used.

Figure 2:
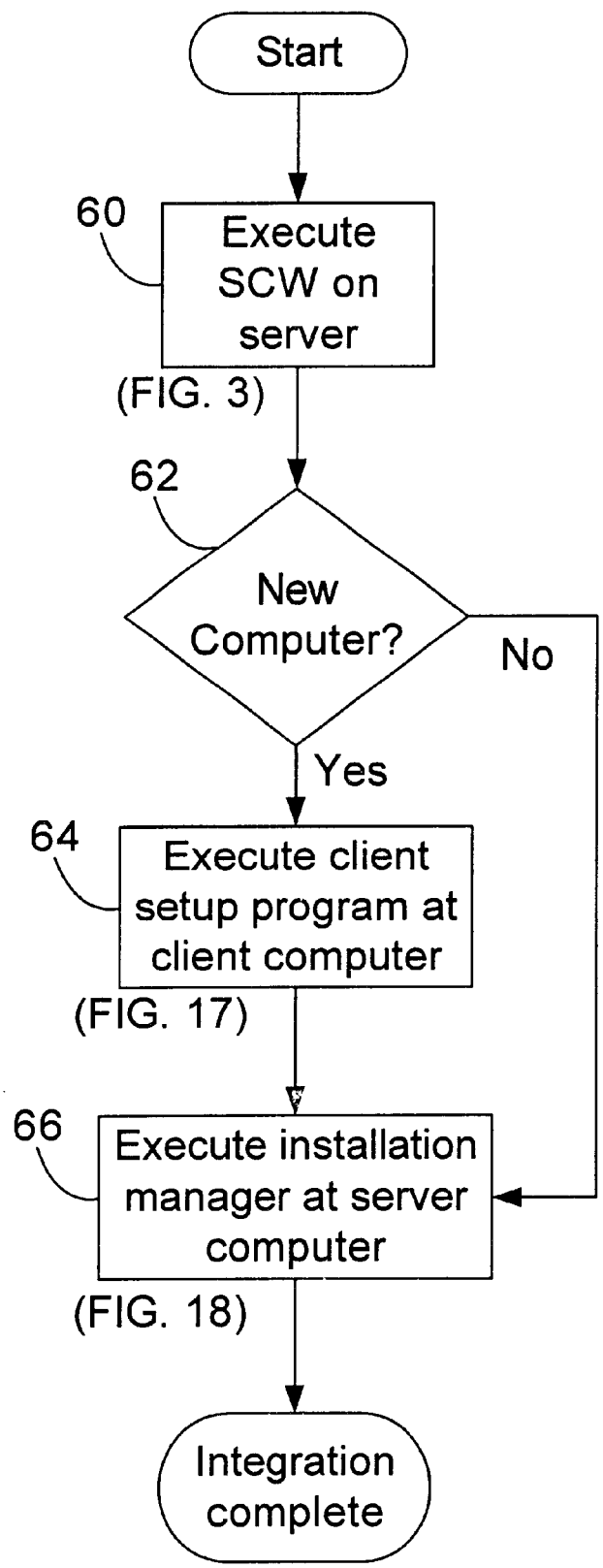
FIG. 2 is a flow chart outlining the process of integrating a client computer.
Figure 3:
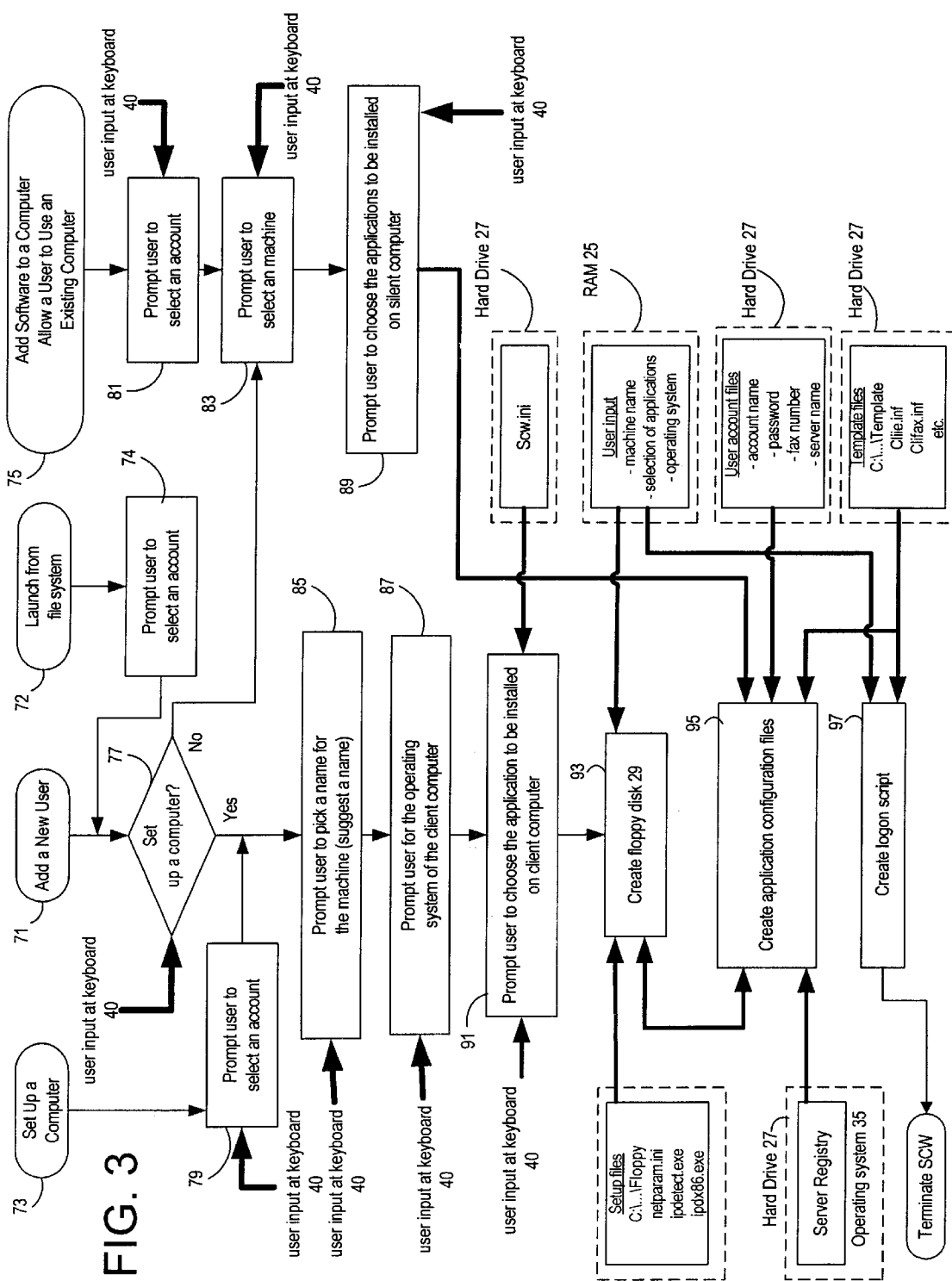
FIG. 3 is a flow chart describing the execution of the Set-Up Computer Wizard in detail.
Figure 17:
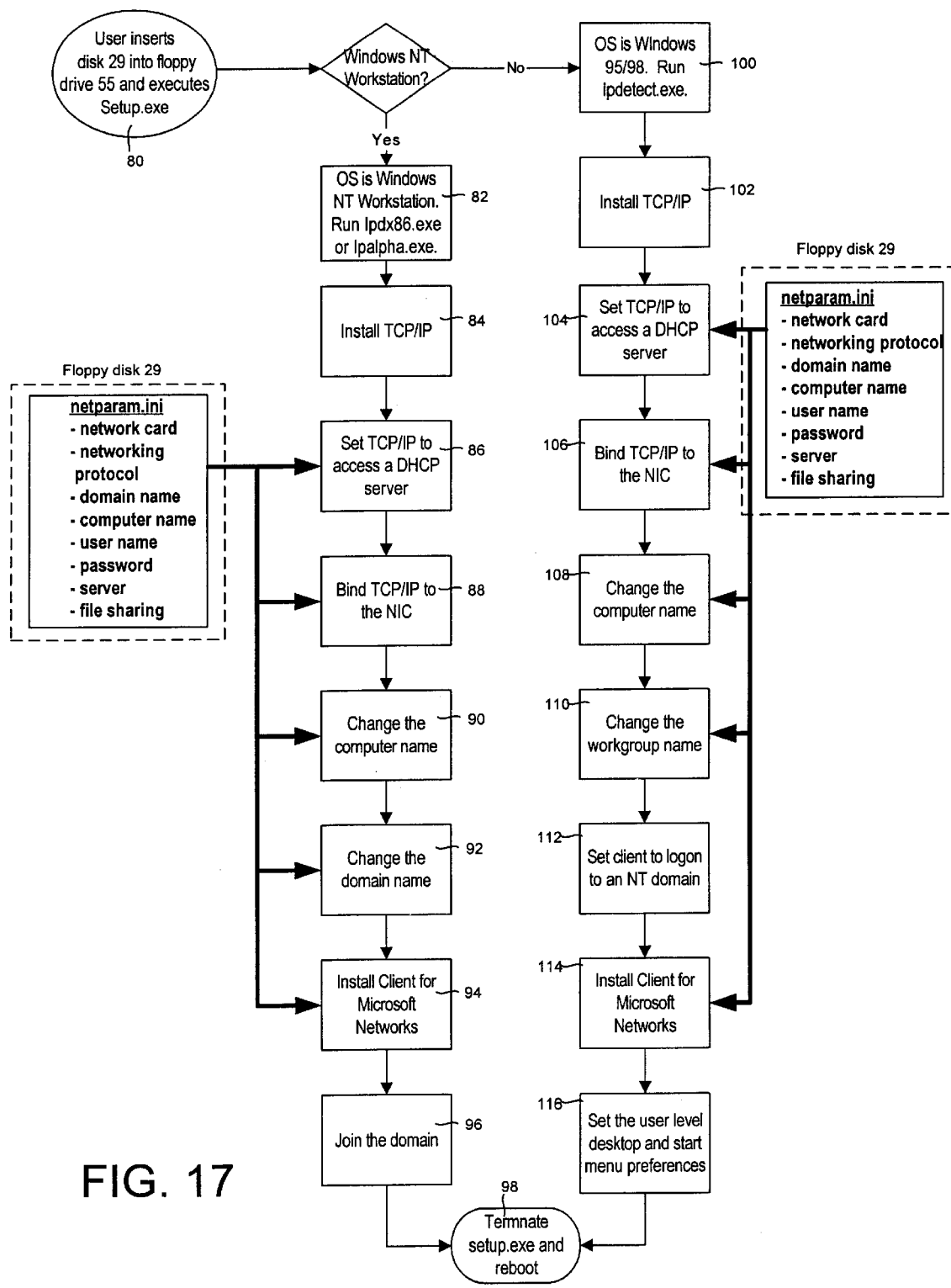
FIG. 17 is a flow chart describing the execution of the client set-up program in detail.
Figure 18:
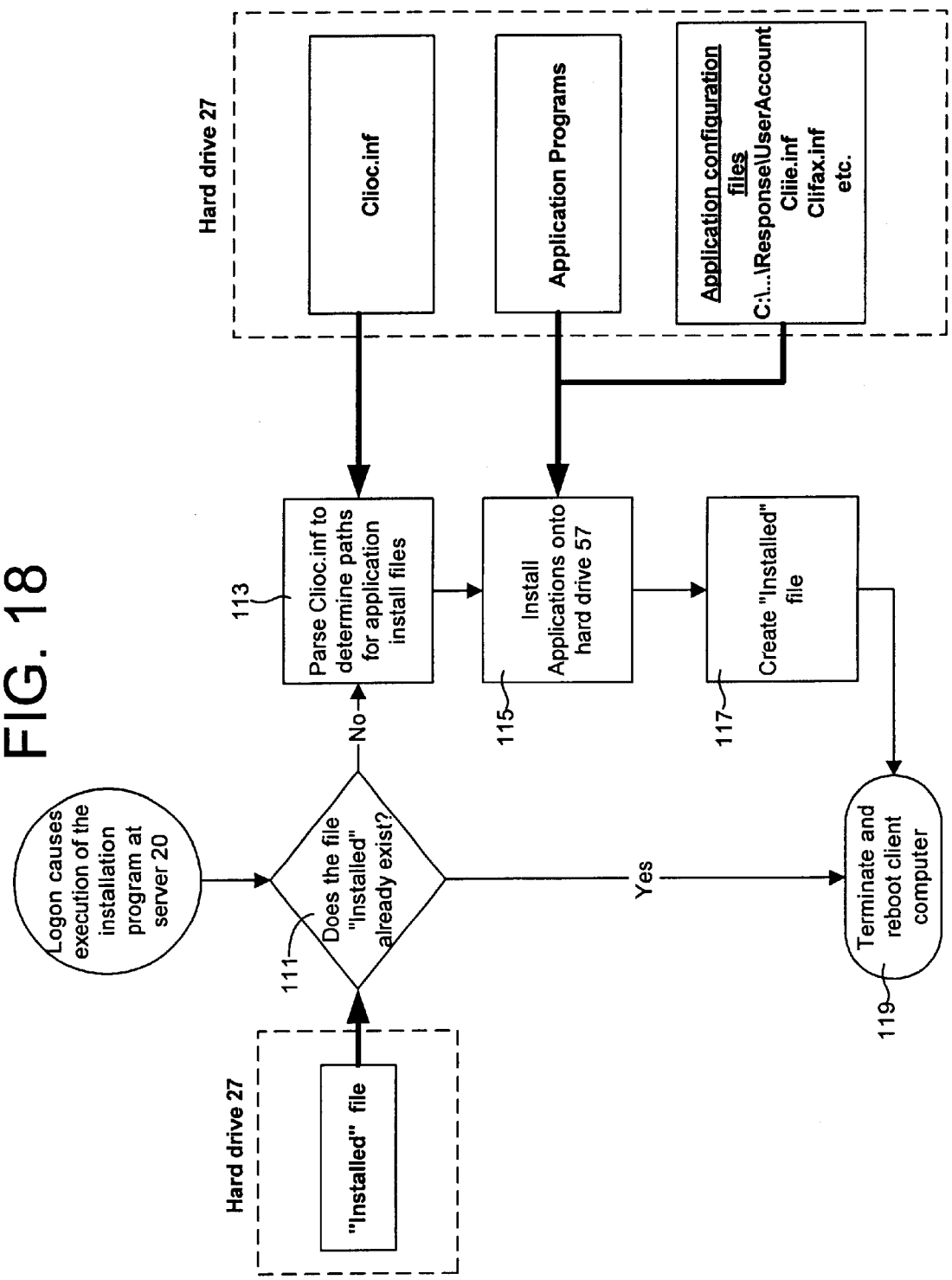
FIG. 18 is a flow chart describing the execution of the installation program in detail.

Referring to FIG. 2, a flowchart outlines the general procedure for integrating a client computer according to a preferred embodiment of the invention. More detailed flowcharts describing steps 60, 64 and 66 are shown in FIG. 3, FIG. 17, and FIG. 18 respectively. The procedure will be described in the context of the exemplary operating environment of FIG. 1.

At step 60, SCW executes on server 20, creating the application configuration files and generating the client set-up program, if necessary. If client computer 49 is new to the network, then step 64 will be performed, in which the client set-up program executes on client computer 49 to configure it for communication with server 20. If client computer 49 is already communicating with the network and only needs to have additional application programs installed, then step 64 is skipped. At step 66, the installation manager executes at server 20 to install application programs onto client computer 49. After step 66 is performed, integration of client computer 49 into the network is complete.

Figure 3A:
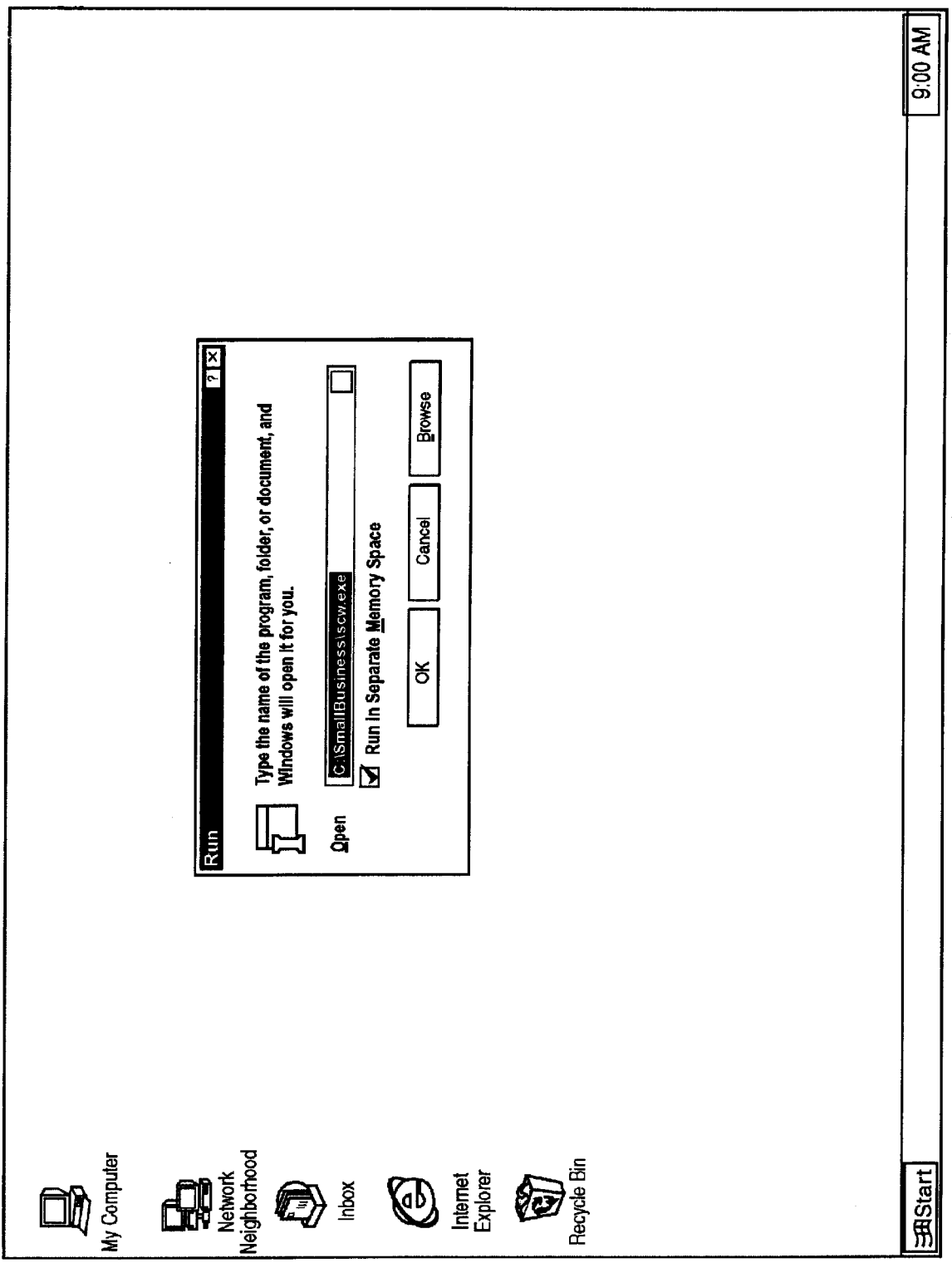
FIGS. 3a, 4, and 4a are screen pictures from a preferred embodiment of the invention showing user interfaces from which the Set-Up Computer Wizard can be executed.

Referring to FIG. 3, a flowchart expands the execution of SCW (step 60, FIG. 2) into greater detail. SCW can be launched directly from the file system (FIG. 3a), but typically executes when the user selects one of three options found on the "Manage Computers" menu (FIG. 4) of the "BackOffice® Small Business Server": Set Up a Computer, Allow a User to Use an Existing Computer, and Add Software to a Computer. SCW can be launched from the "Online Guide," where these three options are also found (FIG. 4a). The user also has the option of executing SCW at the end of the Add a New User procedure found on the "Manage Users" menu (FIG. 5).

Figure 6:
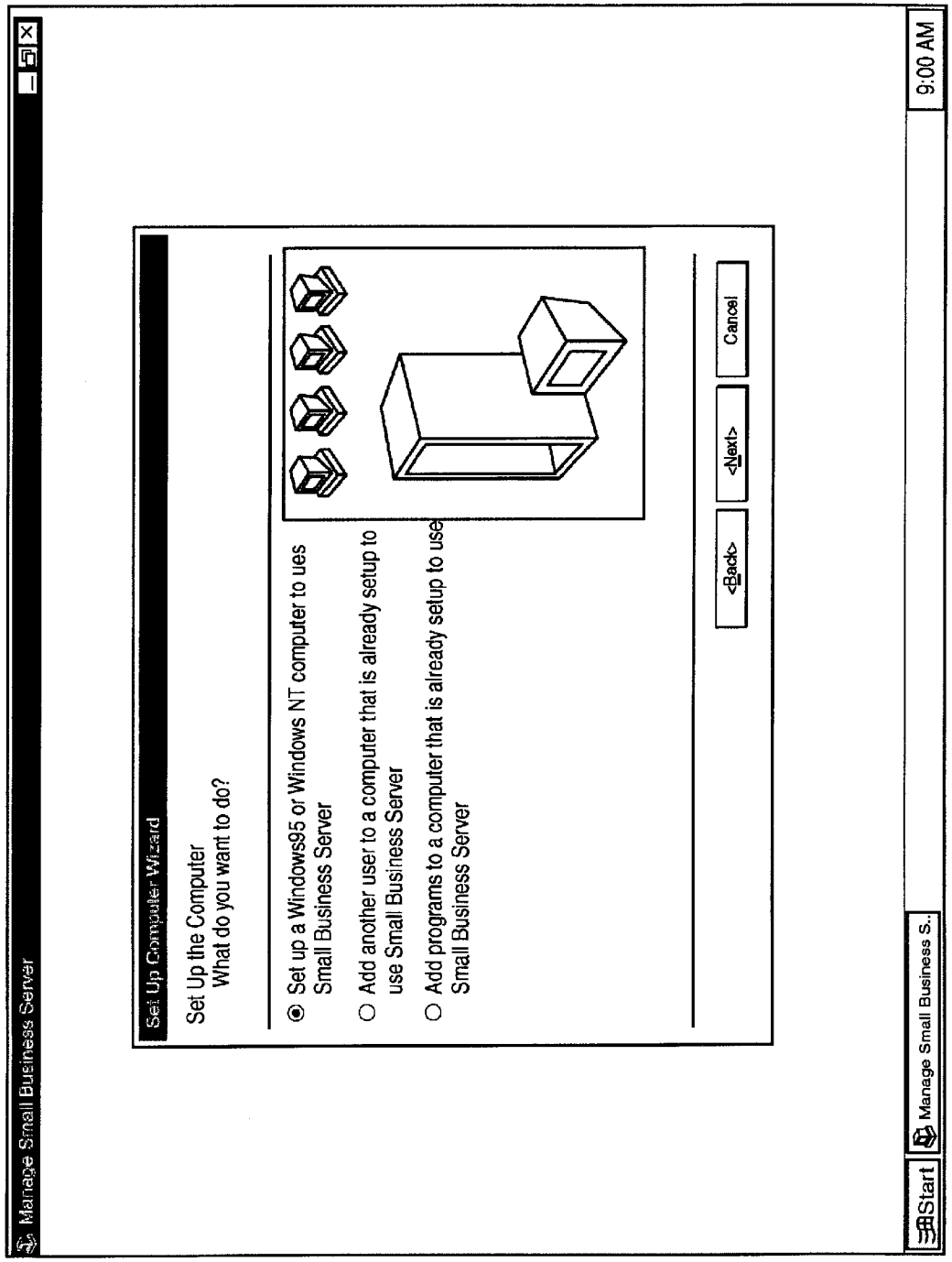
FIGS. 6, 7, 8, 9 and 10 are a screen pictures from a preferred embodiment of the invention showing user interfaces presented during execution of the Set-Up Computer Wizard.
Figure 7:
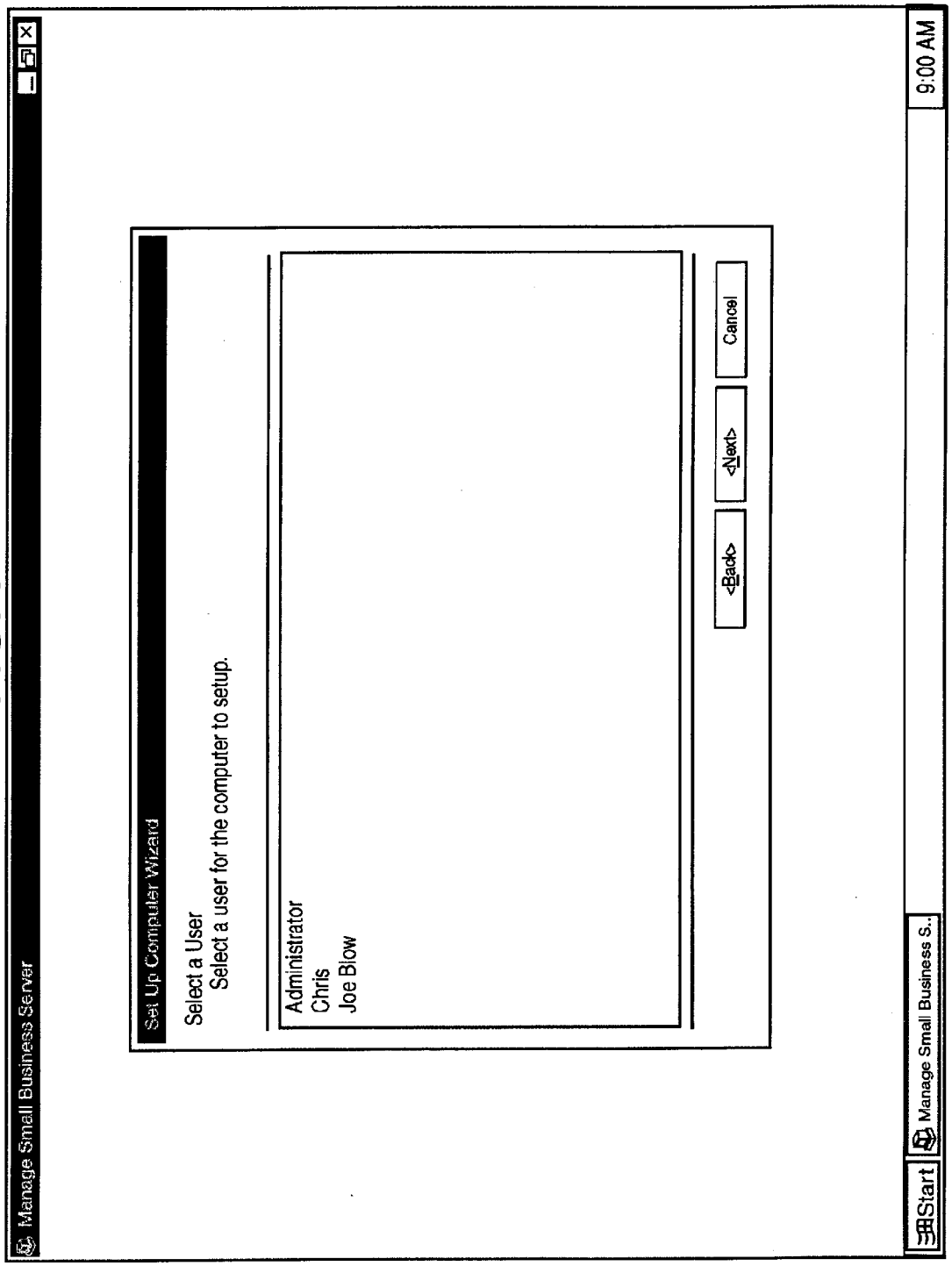

There are four start points in the flowchart of FIG. 3. SCW executes at start point 72 if it is launched from the file system as shown in FIG. 3a. At step 74 the user is prompted to select a user account as in FIG. 7. At this point, the process moves to step 77, where the flow is identical to that of executing form the Add a New User option at start point 71. At step 77 the user is presented with the option to set up a computer, add another user to the existing computer, or to add software to an existing computer. The GUI for these options is shown in FIG. 6. These options parallel the choices presented on the "Manage Computers" menu of FIG. 4 and the "Online Guide" of FIG. 4a. The only difference between starting SCW from the "Manage Computers" or "Online Guide" menus and starting SCW following Add a New User is that in the former methods the user is prompted to choose an account, whereas in the latter method the account is assumed by SCW to be the one the user has just established. After step 77, the Add New User method merges with the three options from the "Manage Computers" menu.

Figure 4:
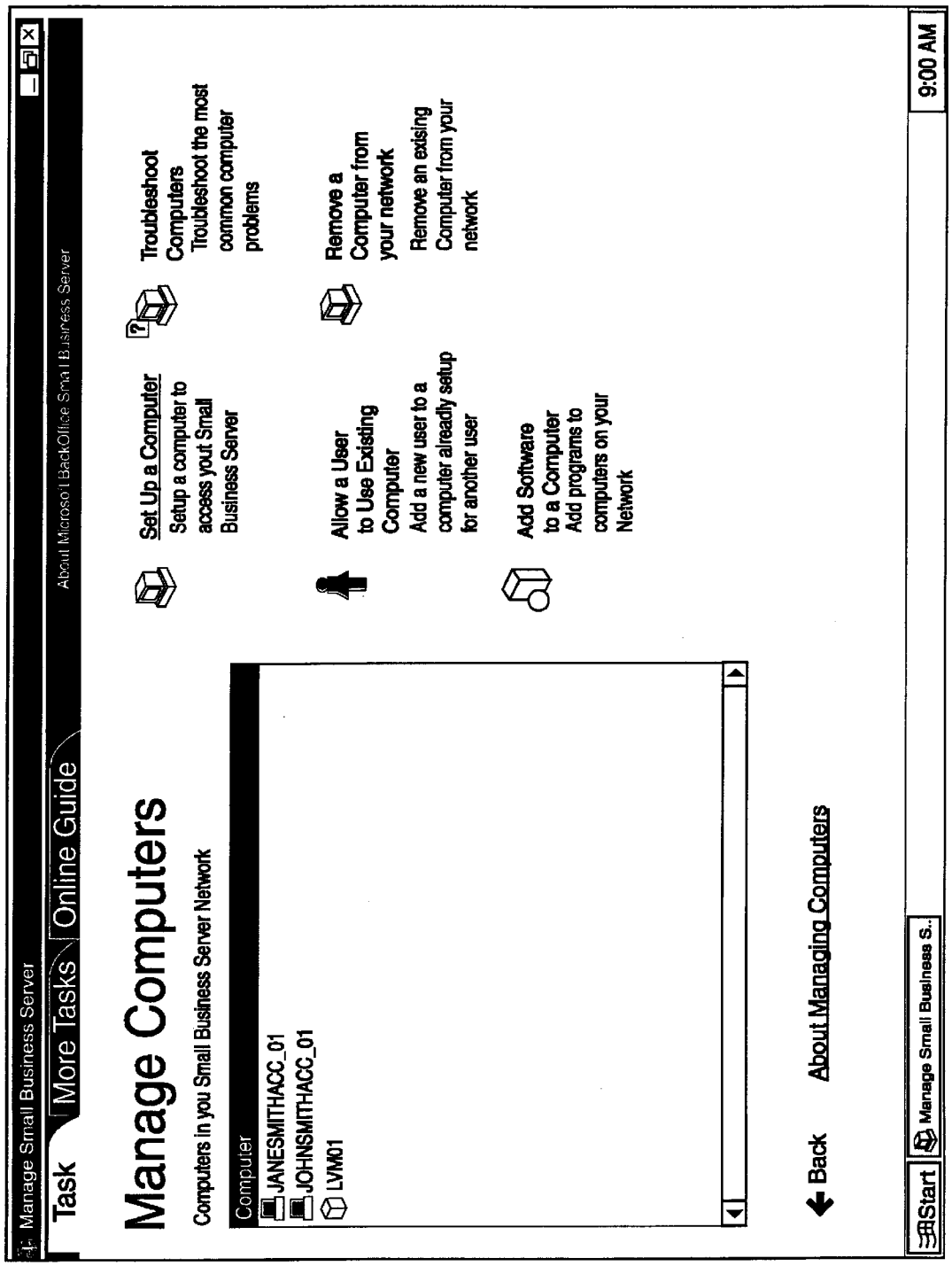
Figure 4A:
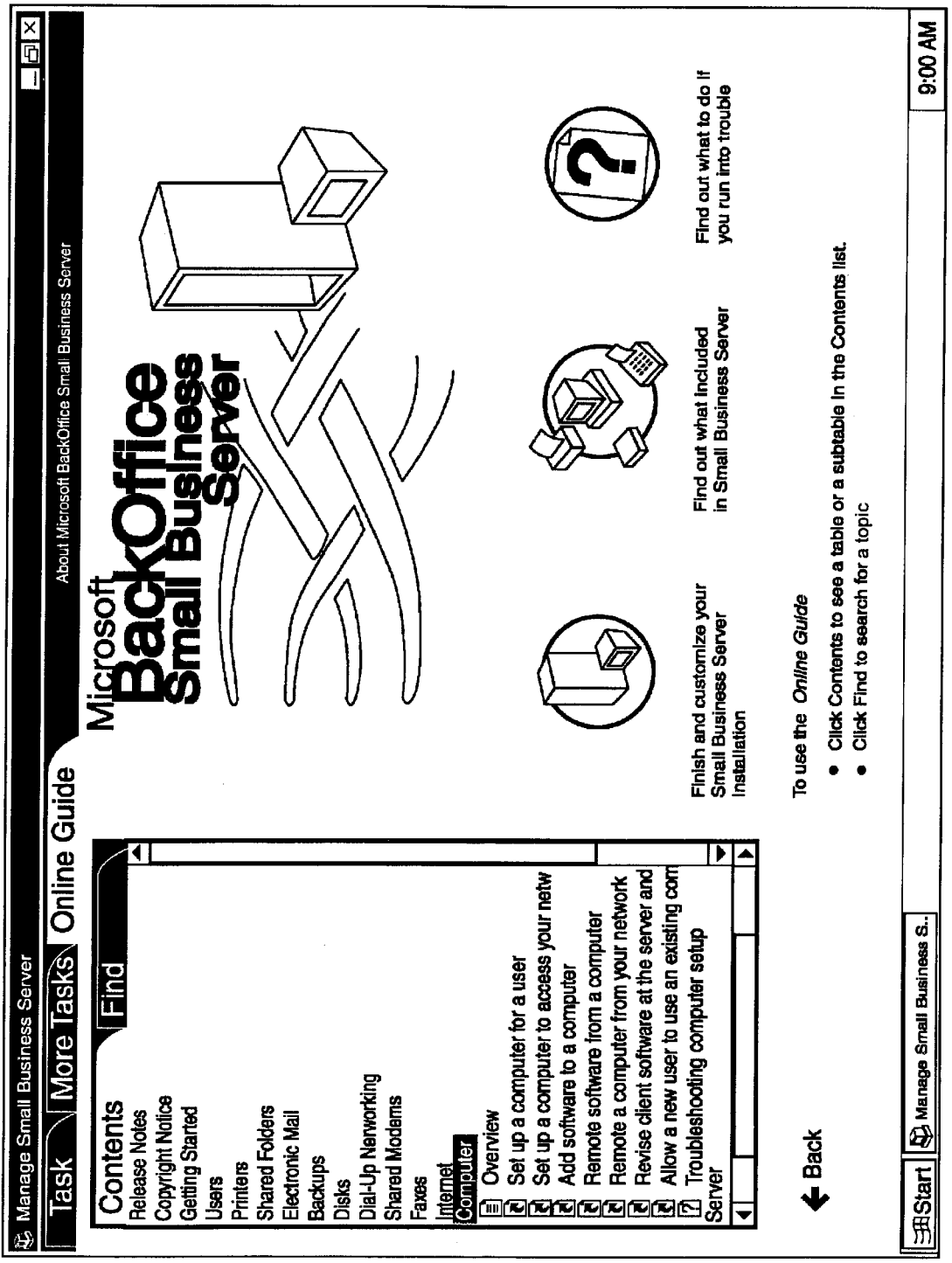
Figure 5:
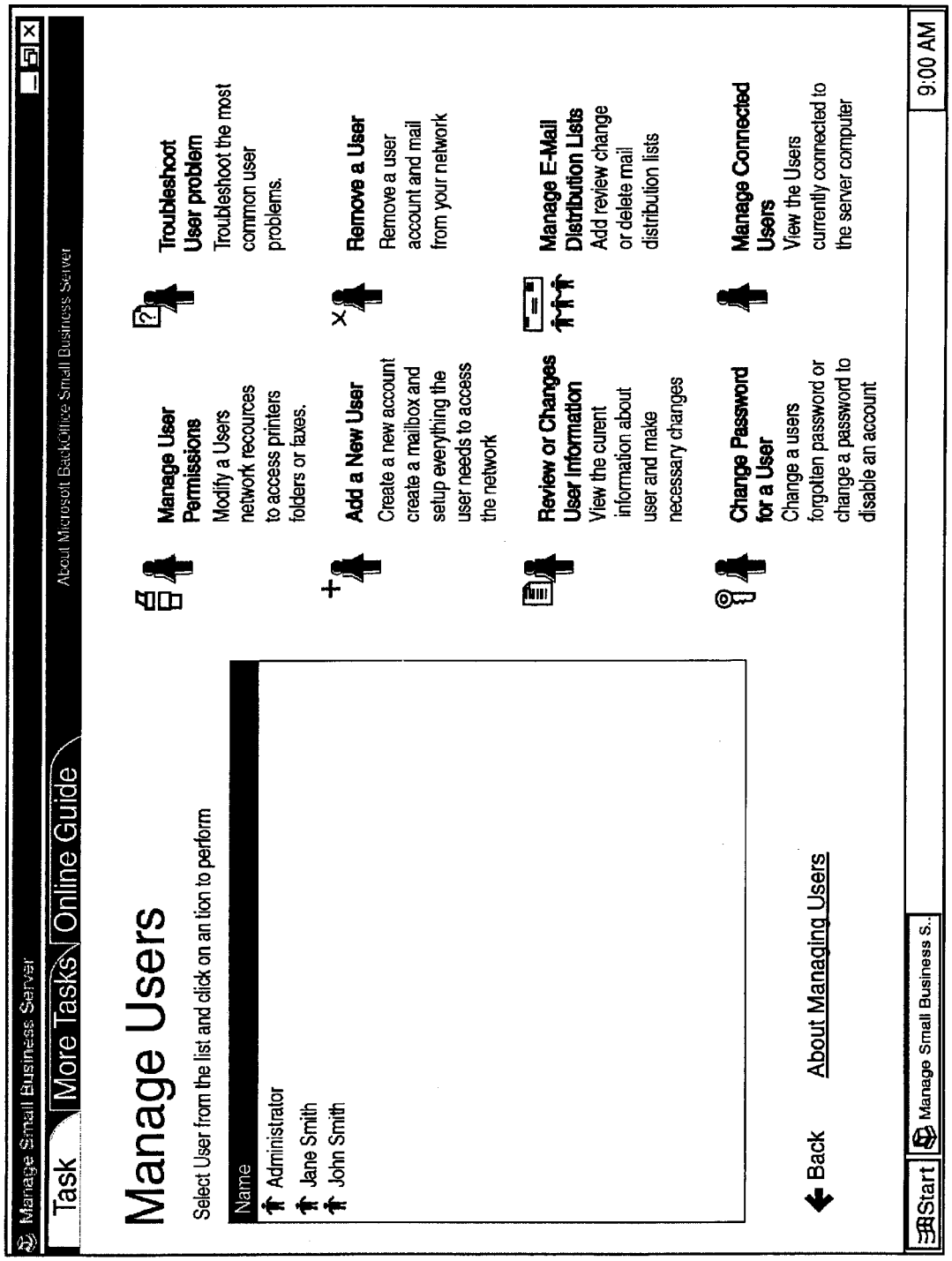
FIG. 5 is a screen picture from a preferred embodiment of the invention showing a user interface from which a user account can be created.

Start point 73 is entered if the user chooses the Set Up a Computer option at the "Manage Computers" menu of FIG. 4 or the "Online Guide" of FIG. 4a. At step 73, SCW prompts the user to select which existing user will be accessing the new client computer, as in FIG. 7. The steps taken by SCW from this point on are identical to the steps taken when the user selects "Set up a Windows 95 or Windows NT computer to use Small Business Server" at the GUI of FIG. 6 at step 77.

Figure 8:
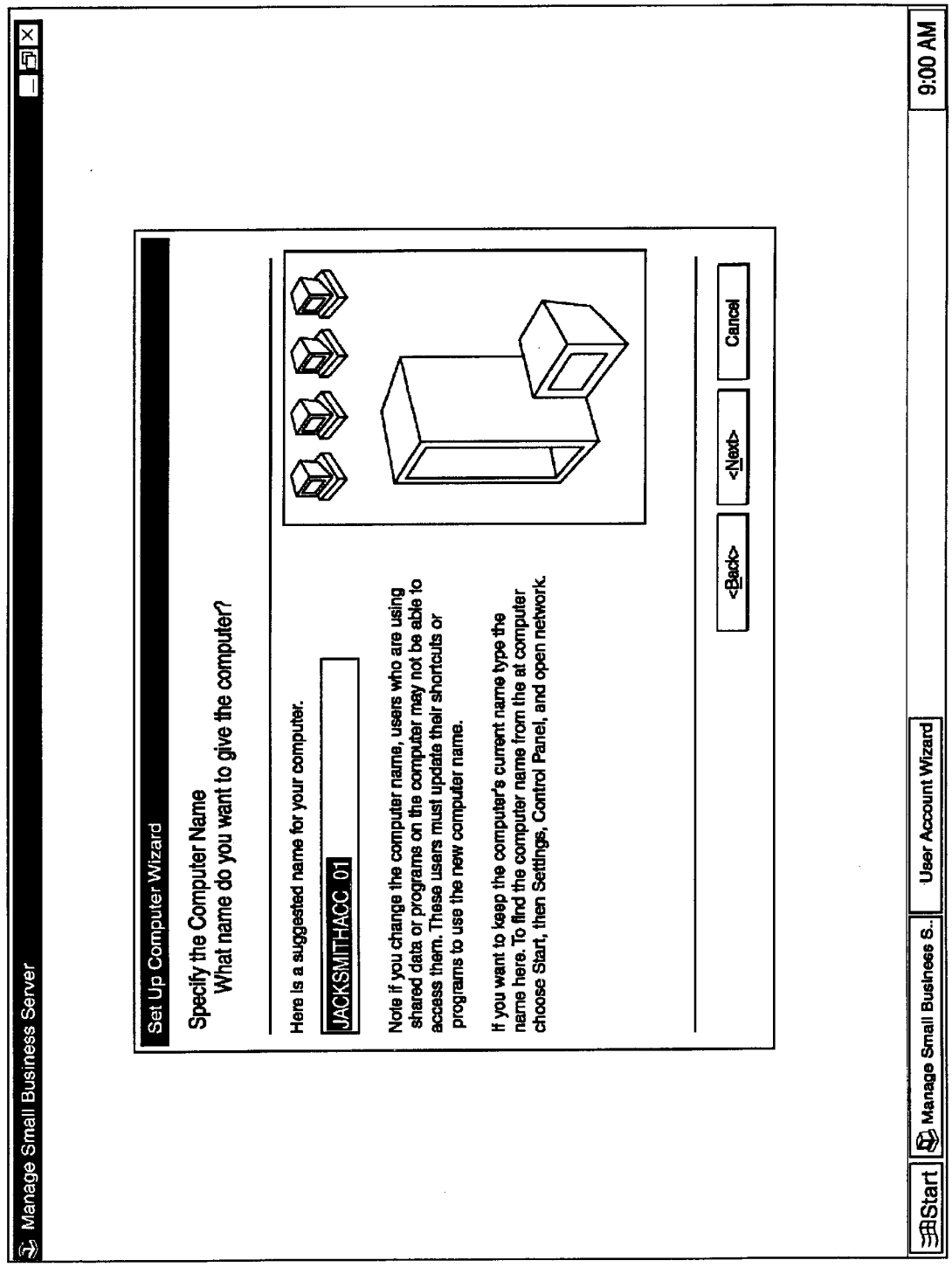
Figure 9:
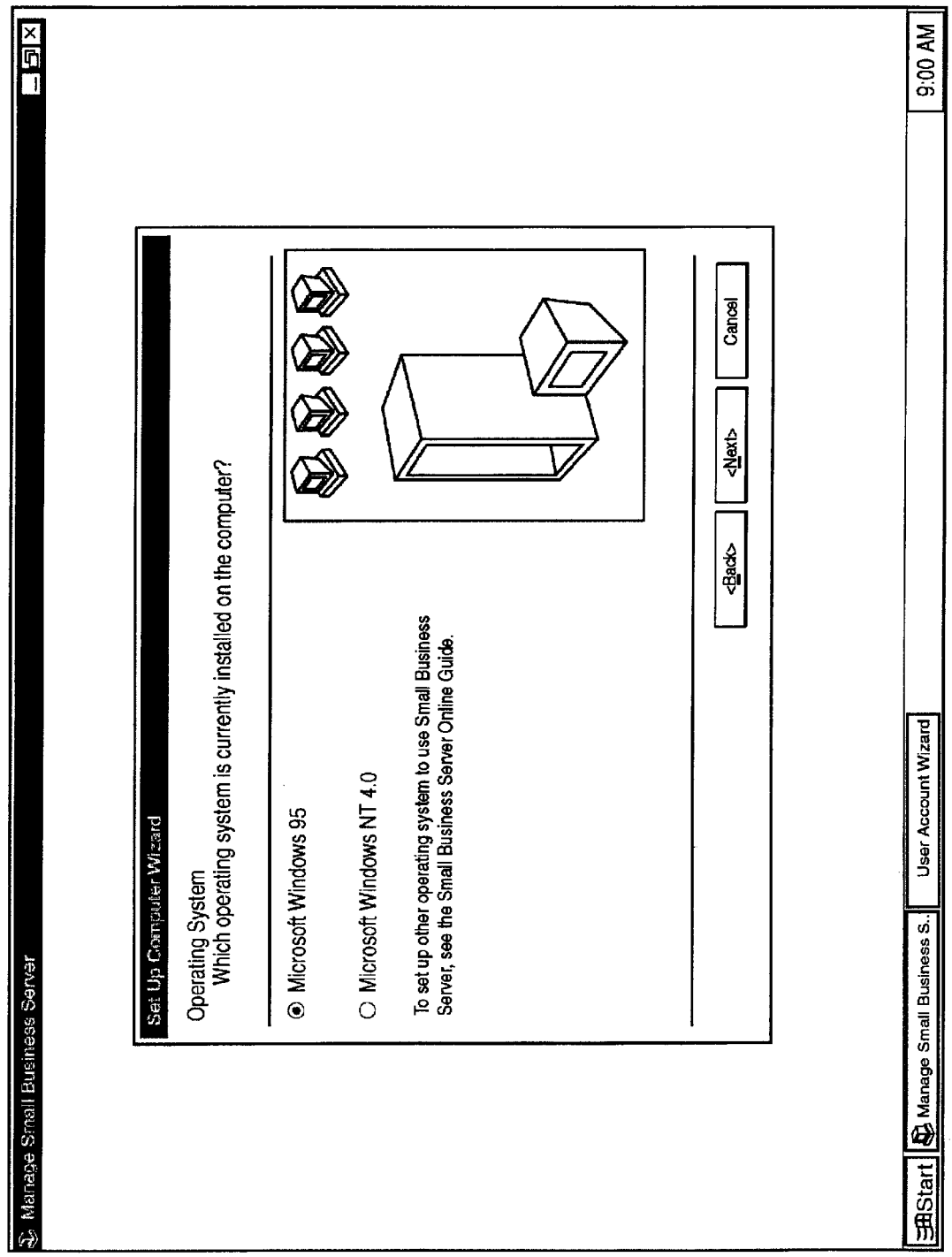

At step 85, the user is prompted with the GUI in FIG. 8 to choose a name for the new client computer. SCW will suggest a name for the user, but the user does not have to accept it. At step 87, SCW prompts the user to choose the operating system for the new client computer, as shown by the GUI in FIG. 9.

Figure 10:
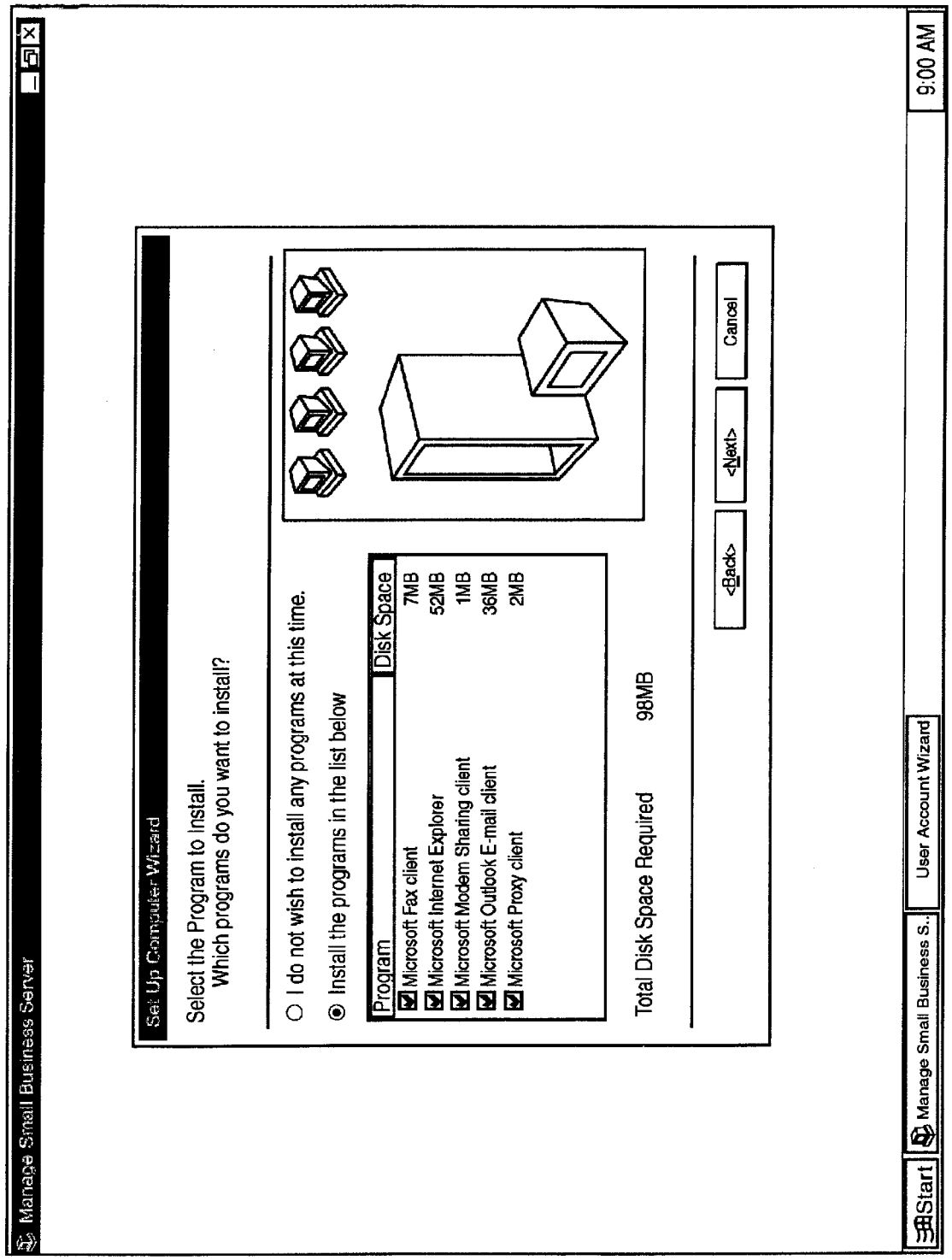

At step 91, SCW presents a list of applications from which the user can choose for installation to the client computer as shown in the GUI of FIG. 10. SCW uses a conventional technique to parse a file called "Scw.ini" to determine which applications are available for installation to the client computer. As shown in the partial listing of FIG. 11, Scw.ini is a text file containing a section of parameters for each application that is eligible to be installed on the client computer. The number of applications in the list is given by "SCW_NumberOfApps=7." In an exemplary embodiment shown here, the number of applications in the list is seven. This number could vary, however. The table of FIG. 12 shows a list of the parameters used in Scw.ini and their functions. Scw.ini is used in step 91 to compile the list of applications from which the user can choose.

At step 93, SCW writes client set-up files to floppy disk 29, using the information that the user has entered, information from the account files (located on hard drive 27) of the intended user of the new client computer, and two set-up files located on hard drive 27. Floppy disk 29 will be used in step 64 of FIG. 2 to configure the new client computer for communication with server 20, although persons skilled in the art would recognize that any other removable computer-readable medium could be used. Two files are copied to the disk: Setup.exe, which runs the client set-up program (described below) and a network parameter file called netparam.ini. SCW creates the netparam.ini file from a template file of the same name located in the "Floppy" folder on hard drive 27. A template file is simply a skeleton file having a series of program statements that use generic character strings, either in the form of blank spaces or placeholders having the conventional "% . . . %" designation. SCW uses a conventional editing method to replace the generic character strings with user-specific data.

User-specific data includes the server name, company name, domain name, and default printer, which SCW extracts from the server operating system registry. Details on the structure and use of the Windows® NT operating system registry can be found in pages 471–502 of The Complete Reference—Windows® NT 4, by Griffith Wm. Kadinier, published by Osborne McGraw Hill, Berkely, Calif., Copyright ©1997 and incorporated by reference herein. User-specific data also includes the client computer operating system, the user account name, and the new client computer name, obtained from the user input given in the previous steps. Finally, user-specific data such as the user's fax number and password are also obtained from the account files of the selected user.

Figure 13B:
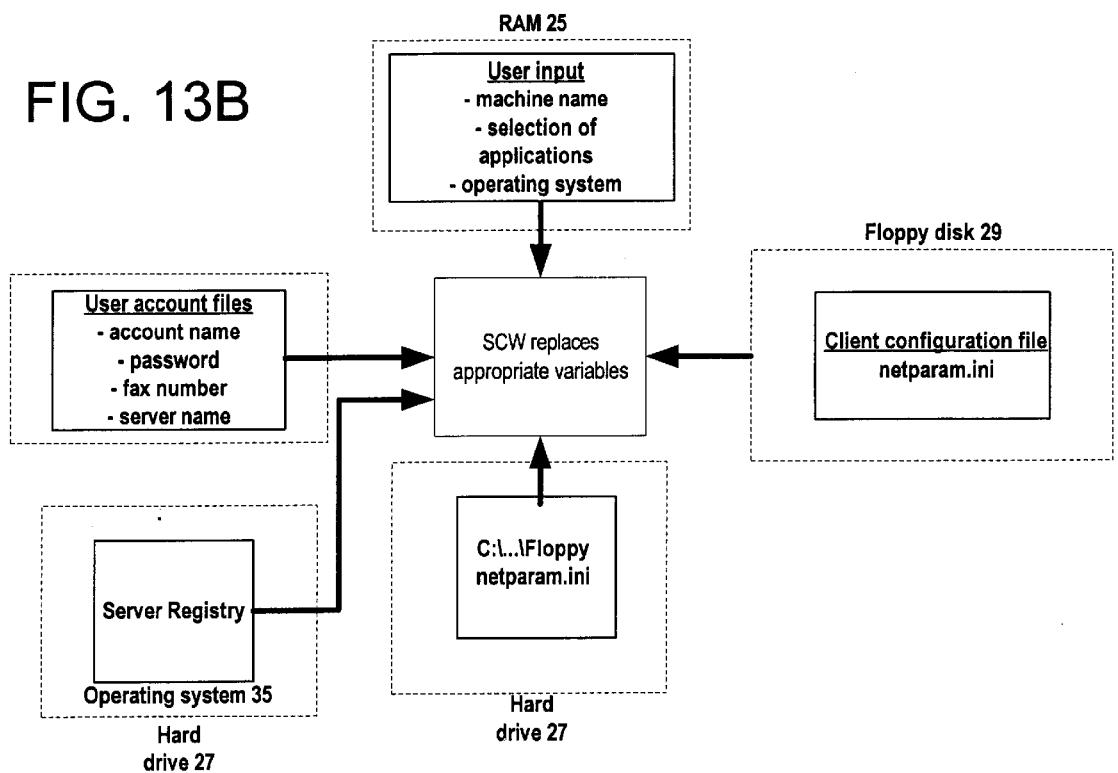
FIG. 13b is a flow diagram showing the process of creating a network parameter file.

An example of a netparam.ini file before and after editing is shown in FIG. 13a. Before SCW edits netparam.ini, for example, there is a blank space in the "User=" field. After the editing process, the field contains the user's account name, "JohnSmithAccount." As shown in FIG. 13b, SCW receives the template file, obtains the user-specific data to fill these fields from the user account files, the server registry, and user input, and produces netparam.ini.

During step 93, SCW also creates the client set-up program with the filename Setup.exe. The client set-up program is used to configure the new client computer at step 64 of FIG. 2. The program incorporates one of three conventional utility programs, idpdetect.exe, ipdx86.exe, or ipalpha.exe depending on the operating system of the new client computer ("Windows® 95/98," or "Windows® NT Workstation") and the architecture of the workstation CPU. These conventional programs are located on hard drive 27 in the "Floppy" folder.

Figure 14B:
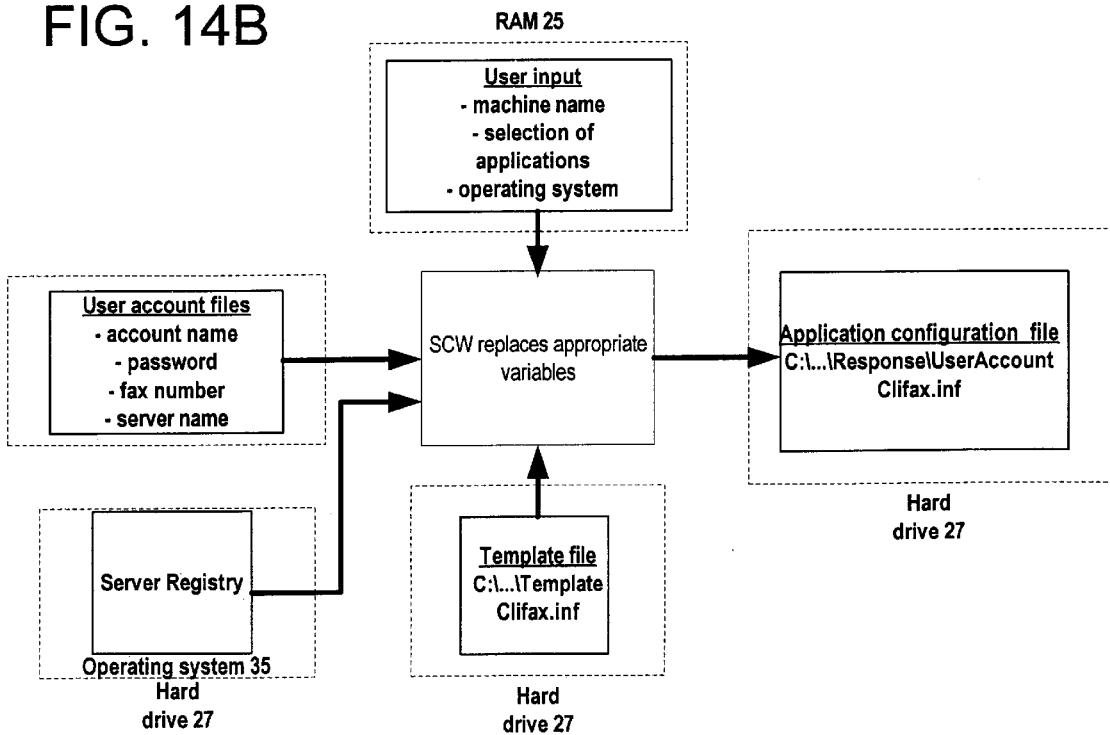
FIG. 14b is a flow diagram showing the process of creating an application configuration file.
Figure 14A:
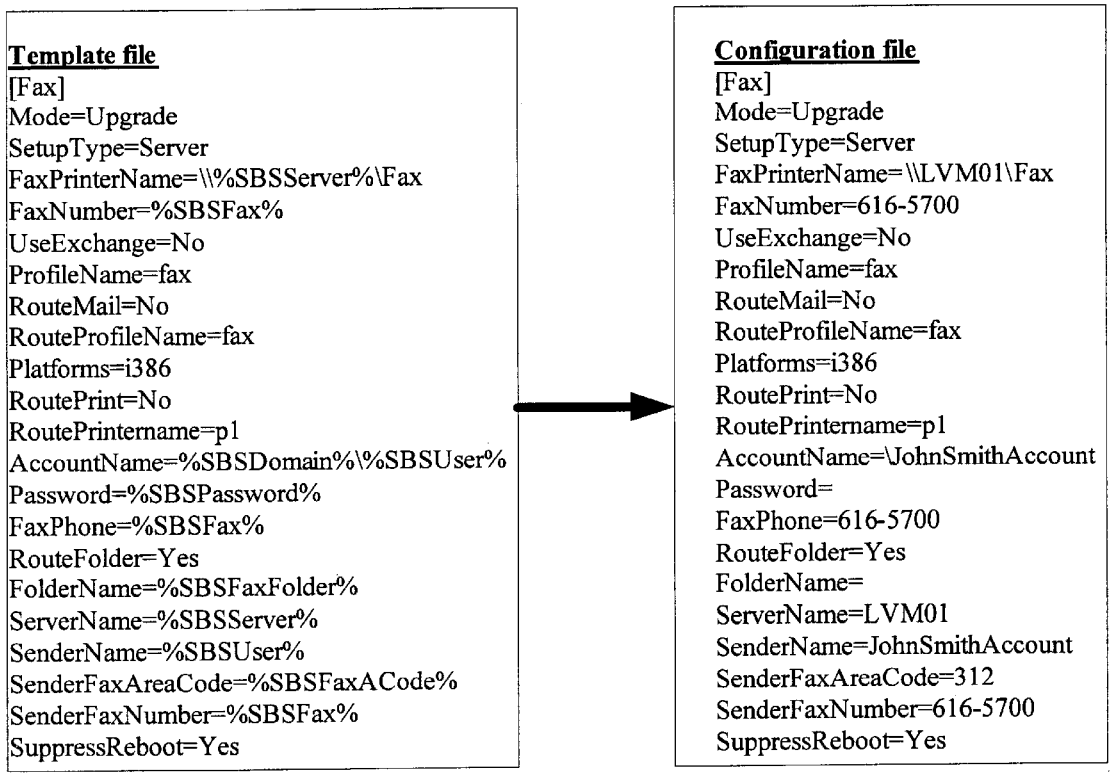
FIG. 14a shows an exemplary template file and the resulting application configuration file created after SCW edits the template file.

At step 95, SCW creates the application configuration files. These files are created from template files, using the method described above for creation of netparam.ini as illustrated in the example of FIG. 14a. Before SCW edits Clifax.inf, the account name field contains "AccountName=%SBSDomain%\%SBSUser%." "%SBSDomain%\%SBSUser%" is generic and needs to be replaced with the actual value for a real user and client computer. After the editing process, the field is "AccountName=JohnSmithAccount" As shown in FIG. 14b, SCW receives the template file, obtains the user-specific account information from the user account files and user input, extracts the user-specific server information from the server operating system registry, and produces Clifax.inf. Once the application configuration files have been created, they are stored on hard drive 27 in a directory for that client computer called a "response directory." The file of this example for use in a fax program by Microsoft®, although Independent Software Vendors (ISVs) and other persons skilled in the art will recognize that a template file can be created for other application programs.

One of the application configuration files created is called "Clioc.inf." Clioc.inf contains a master listing of all the applications that are to be installed on the client computer and the location of any installation programs or files needed. This listing is generated from a template file in the manner described above for the creation of "netparam.ini," and uses input obtained from the user in step 91. All of the application configuration files, including Clioc.inf, are conventional information files used by application installation technologies like InstallShield®.

Figure 15A:
FIG. 15a shows an exemplary template file and a logon script created after SCW edits the template file.
Figure 15B:
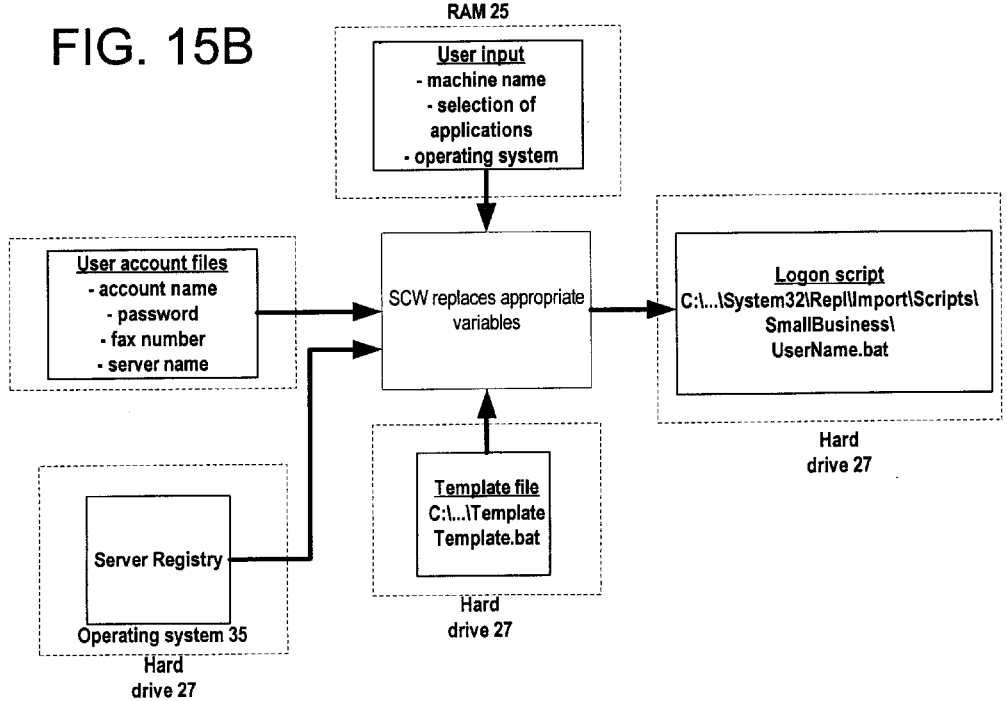
FIG. 15b is a flow diagram showing the process of creating a logon script.

At step 97, a logon script is created for the user of the client computer. This script is created from a template file using the method described above for the creation of netparam.ini and the application configuration files. An example of an logon script before and after being edited by SCW is shown in FIG. 15a. Before SCW edits Template.bat, there is the statement "if '%COMPUTERNAME%'== '%sbsServer%' goto exit." The data "%sbsServer" is generic and needs to be replaced with the server name, which is obtained from the server operating system registry. After the editing process, the field is "if '%COMPUTERNAME%'== 'LVM01' goto exit." As shown in FIG. 15b, SCW receives the template file, obtains the user-specific data from the user account files and user input, extracts user-specific data from the server operating system registry, and produces the logon script. After completion of step 97, the SCW terminates.

Figure 16:
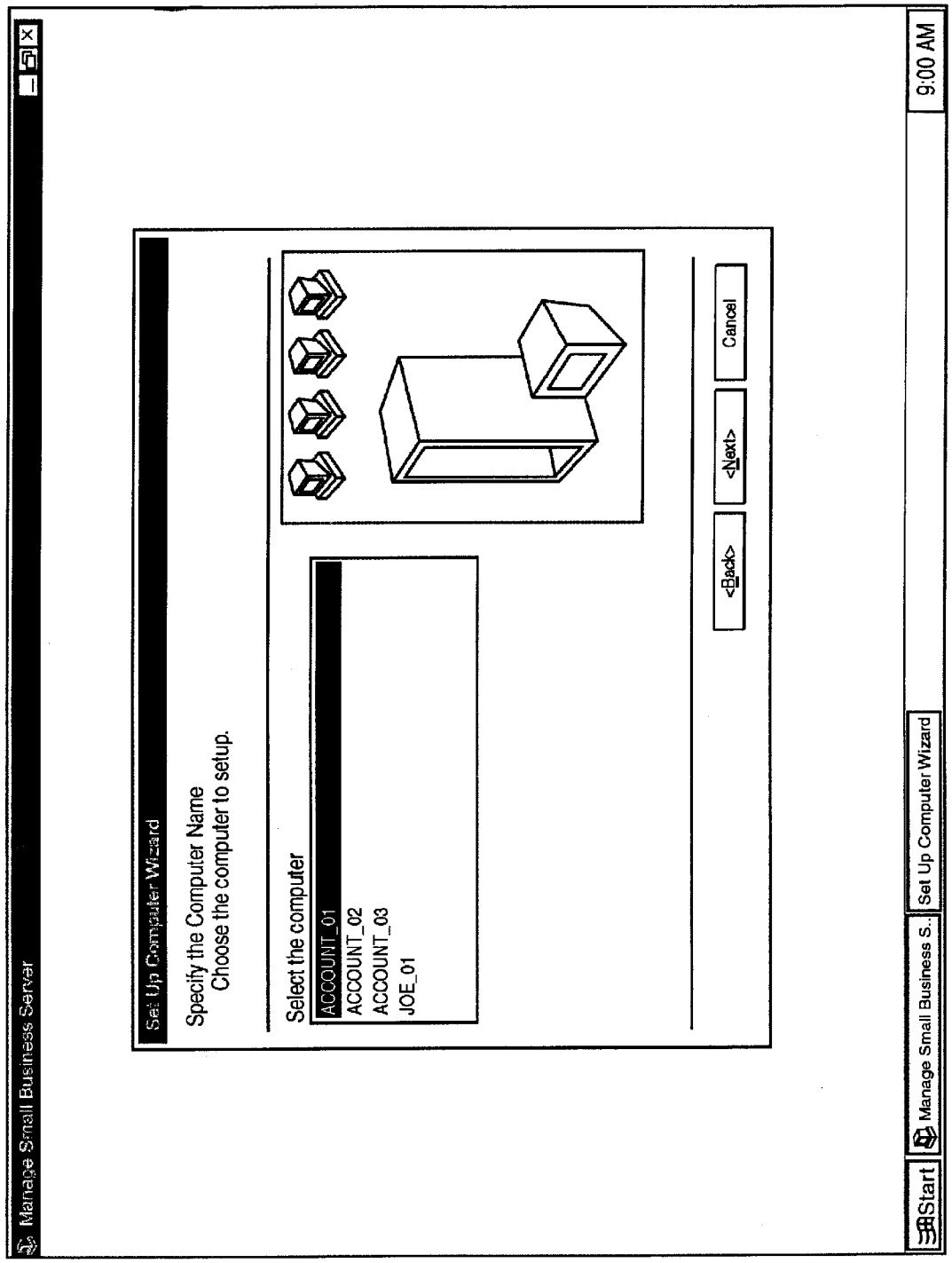
FIG. 16 is a screen picture from a preferred embodiment of the invention showing a user interface presented during execution of the Set-Up Computer Wizard.

Start point 75 of FIG. 3 is entered when either the Allow a User to Use an Existing Computer or Add Software to a Computer option is chosen from the "Manage Computers" GUI of FIG. 4 or the "Online Guide" of FIG. 4a. The steps taken by SCW from this point on are identical to the steps taken when the user selects either "Add another user to a computer that is already set up to use Small Business Server" or "Add programs to a computer that is already set up to use Small Business Server" at the GUI of FIG. 6 in step 77. Steps 81 and 89 are identical to steps 79 and 87 discussed above. The only distinct step on this branch of the flowchart is step 83, in which the user is prompted, as in FIG. 16, to select an existing client machine to which a user or software is to be added.

Referring to FIG. 17, a flowchart expands the execution of the client set-up program (step 64, FIG. 2) into greater detail. At start point 80, the user inserts floppy disk 29 into magnetic disk drive 55 of client computer 49 and executes the client set-up program by running Setup.exe.

A conventional method of configuring a client computer for communication with a server is for an Information Technology (IT) specialist to perform steps 82–98 (for client computers running "Windows® NT Workstation") or 100–116 (for client computers running "Windows® 95/98") by manually changing the settings in the "Control Panel" of "Windows® 95/98" and "Windows® NT," and installing all of the required software. These steps are described on pages 249–262 of the Microsoft® Windows® 95 Resource Kit, published by Microsoft® Press, Redmond, Wash., Copyright ©1995 and incorporated herein by reference.

In the present invention, these steps are performed automatically by the client set-up program which derives the required networking parameters from the user-specific data of the netparam.ini file using a conventional parsing technique. On clients running the Windows® NT Workstation operating system, the client set-up program runs ipdx86.exe (on workstations with x86 CPUs) or ipalpha.exe (on workstations with DEC Alpha® or compatible CPUs). The client set-up program detects the NIC in step 82. It then subclasses and calls the network control panel applet (NCPA), and passes the user-specific information contained in netparam.ini, including the networking parameters, to the NCPA. It then directs the NCPA to install a conventional network protocol, TCP/IP, on the client computer at step 84, set the TCP/IP to access a DHCP server in step 86, and bind the protocol to the NIC in step 88. The client set-up program then directs the NCPA to change the computer name, domain name, and join the client to the domain in steps 90, 92, and 96. The client set-up program also installs Client for Microsoft Windows® in step 94. At every step in the client set-up procedure, the client set-up program causes the NCPA to update the client operating system registry where appropriate. Subclassing an applet is a conventional Windows® programming technique.

On client computers running the Windows® 95/98 operating system, the client set-up program runs idpetect.exe. The client set-up program detects the NIC in step 100. It then utilizes Plug and Play technology to detect the current networking configuration, including the NIC, and pass the user-specific information contained in netparam.ini, including the networking parameters, to the network class installer. The client set-up program then directs the network class installer to install a conventional network protocol, TCP/IP, on the client computer at step 102, set the TCP/IP to access a DHCP server in step 104, and bind the protocol to the NIC in step 106. It then causes the network class installer to change the computer name, workgroup name, and set the client computer to logon to an NT domain in steps 108, 110, and 112. The client set-up program also installs Client for Microsoft Windows® in step 114. At every step in the client set-up procedure, the client set-up program causes the network class installer to update the client operating system registry where appropriate. Details on the structure and use of the Windows® 95/98 operating system registry can be found in pages 241–247 of *Peter Norton's Complete Guide to Windows®95*, by Peter Norton and John Paul Mueller, published by SAMS Publishing, Indianapolis, Ind., Copyright ©1998 and incorporated by reference herein. Control of the network class installer is a conventional use of Plug and Play technology. A description of Plug and Play technology can be found on pages 180–181, 251, 258–259, 592–593, 967, and 971–973 of the *Microsoft® Windows® 95 Resource Kit,* published by Microsoft® Press, Redmond, Wash., Copyright ©1995 and incorporated herein by reference.

After the networking parameters have been set, the client set-up program reboots the client computer, forcing the user to logon to the server in step 98, thereby completing the configuration of the client. Once the user logs on to the server, the logon script created in step 97 of FIG. 3 executes, and runs the installation manager at the server computer as shown in step 66 of FIG. 2.

The flowchart shown in FIG. 18 describes the execution of the installation manager of step 66 of FIG. 2. At step 111, the installation manager searches the response directory of that client computer for a file with the name "installed." An "installed" file contains no data, and simply exists to inform the installation manager that applications have already been installed to that client computer. If the installed file exists, then the installation manager terminates. Otherwise, the installation manager proceeds to step 113.

In step 113, the installation manager uses a conventional parsing technique to extract information from the "Clio-c.inf" file. The information extracted includes the names and paths of the application configuration files corresponding to the applications that are to be installed. The installation manager also extracts the names and paths of the executable installation programs. The creation and use of executable install programs as well as the use of application configuration files to customize installation are well-known.

The installation manager then runs the executable install programs. At step 115, each install program transfers the files of an application program from hard drive 27 and installs them on client computer hard drive 50 using a conventional technique known as "push" installation. At step 117, the installation manager creates an "Installed" file in the client computer's response directory. The client machine is then rebooted in step 119. The client will now be fully integrated into the network.

In view of the many possible embodiments to which the principles of this invention may be applied, it should be recognized that the embodiment described is meant to be illustrative only and should not be taken as limiting the scope of invention. For example, those of skill in the art will recognize that elements of the illustrated embodiment shown as software may be implemented as hardware and vice versa or that the illustrated embodiment can be modified in arrangement and detail without departing from the spirit of the invention. Therefore, the invention as described contemplates all such embodiments as may come within the scope of the following claims and equivalents thereof.

What is claimed is:

1. A method of installing user applications from a server computer to a client computer, the method comprising:

at the server computer:
presenting to a user who is physically present at the server computer a plurality of user applications that may be installed on the client computer;
receiving a selection from the user of which of the plurality of user applications the user wishes to have installed on the client computer;
storing at least one configuration file onto a removable computer readable medium, the configuration file including parameters usable by the client computer to configure the client computer for communication with the server computer;
storing a setup program on the removable computer readable medium, the setup program being executable to change one or more network settings on the client computer based on the configuration file; and at the client computer:
upon physical transfer of the removal computer readable medium from the server computer to the client computer, executing the setup program on the client computer to configure the client computer for communication with the server computer; and
receiving an installation of the selected user applications from the server computer.

2. A computer-readable medium having stored thereon computer-executable instructions for performing the method of claim 1.

3. The method of claim 1, further comprising:
at the server computer:
receiving an input of a user name from the user; and
including the user name into the configuration file.

4. The method of claim 1, wherein the removable computer readable medium is a floppy disk.

5. The method of claim 1, wherein the selected user applications include a fax program.

6. The method of claim 1, wherein the selected user applications include an internet browser program.

7. The method of claim 1, wherein the selected user applications include a modem sharing program.

8. The method of claim 1, wherein the selected user applications include an email program.

9. The method of claim 1, wherein the selected user applications include a proxy program.

10. The method of claim 1, further comprising the user physically transferring the computer-readable medium from the server computer to the client computer.

11. The method of claim 1, further comprising:
the user removing the computer-readable medium from a drive of the server computer upon completion of the step of storing a setup program on the computer-readable medium; and
the user inserting the computer-readable medium into a drive of the client computer prior to the step of executing the setup program.

12. A method of configuring a client computer for communicating with a linked server computer, the method comprising:

at the server computer:
collecting network parameters in response to a first user-initiated command, wherein the network parameters comprise server data extracted from a file accessible by an operating system residing on the server computer;
storing the network parameters on a removable computer readable medium in preparation for physical transfer of the removable computer readable medium to the client computer; and
providing the computer-readable medium to a user, thereby allowing the user to transfer the computer-readable medium to the client computer;

at the client computer:
receiving the computer-readable medium from the user;
in response to a second user-initiated command, reading the network parameters from the transferred computer readable medium; and,
installing the network parameters to a file accessible by an operating system residing on the client computer.

13. A computer-readable medium having stored thereon computer-executable instructions for performing the method of claim 12.

14. The method of claim 12, wherein collecting network parameters further comprises receiving a client computer name as a user input.

15. The method of claim 12, wherein collecting network parameters further comprises receiving a user name as a user input.

16. The method of claim 12, wherein collecting network parameters further comprises obtaining the name of the server computer from the operating system residing on the server computer.

17. The method of claim 12, wherein collecting network parameters further comprises obtaining the name of the network domain to which the server computer belongs from the operating system residing on the server computer.

18. The method of claim 12, wherein collecting network parameters further comprises obtaining the name of an organization that uses the server computer from the operating system residing on the server computer.

19. The method of claim 12, wherein collecting network parameters further comprises obtaining the name of a default printer of the server computer from the operating system residing on the server computer.

20. The method of claim 12, further comprising:
at the client computer, installing a network protocol to facilitate communication between the client computer and the server computer.

21. The method of claim 12, further comprising:
at the client computer, binding a network protocol to an interference card associated with the client computer to facilitate communication between the client computer and the server computer.

* * * * *

UNITED STATES PATENT AND TRADEMARK OFFICE
CERTIFICATE OF CORRECTION

PATENT NO. : 6,449,642 B2  
DATED : September 10, 2002  
INVENTOR(S) : Bourke-Dunphy et al.

Page 1 of 1

It is certified that error appears in the above-identified patent and that said Letters Patent is hereby corrected as shown below:

<u>Column 6,</u>  
Line 15, "User=" should read -- "User =" --.  
Line 36, "AccountName= "should read "AccountName = "--.  
Line 41, "AccountName=JohnSmithAccount" should read -- "AccountName = JohnSmithAccount." --.

<u>Column 7,</u>  
Lines 12 and 13, the text should be underlined.  
Line 39, the text should be in italics.

Signed and Sealed this

Nineteenth Day of August, 2003

JAMES E. ROGAN  
*Director of the United States Patent and Trademark Office*